(12) United States Patent
Lynderup et al.

(10) Patent No.: US 8,601,688 B2
(45) Date of Patent: Dec. 10, 2013

(54) METHOD AND DEVICE FOR MOUNTING OF WIND TURBINE BLADES

(75) Inventors: Henrik Fomsgaard Lynderup, Skals (DK); Jesper Moeller, Esbjerg (DK)

(73) Assignee: Siemens Aktiengesellschaft, München (DE)

( * ) Notice: Subject to any disclaimer, the term of this patent is extended or adjusted under 35 U.S.C. 154(b) by 1098 days.

(21) Appl. No.: 12/515,805

(22) PCT Filed: Nov. 23, 2007

(86) PCT No.: PCT/EP2007/010221
§ 371 (c)(1),
(2), (4) Date: May 21, 2009

(87) PCT Pub. No.: WO2008/061797
PCT Pub. Date: May 29, 2008

(65) Prior Publication Data
US 2010/0018055 A1  Jan. 28, 2010

(30) Foreign Application Priority Data

| Nov. 23, 2006 | (EP) | 06024336 |
|---|---|---|
| Nov. 23, 2006 | (EP) | 06024337 |
| Jul. 12, 2007 | (EP) | 07013724 |
| Jul. 12, 2007 | (EP) | 07013725 |

(51) Int. Cl.
*B21D 53/78* (2006.01)
(52) U.S. Cl.
USPC .......................... 29/889; 212/256
(58) Field of Classification Search
USPC .......................... 29/889; 212/256
See application file for complete search history.

(56) References Cited

U.S. PATENT DOCUMENTS

| 2005/0019166 A1* | 1/2005 | Bervang ............ 416/244 A |
|---|---|---|
| 2006/0120809 A1 | 6/2006 | Ingram |
| 2006/0147308 A1 | 7/2006 | Wobben |

FOREIGN PATENT DOCUMENTS

| CN | 1688808 A | 10/2005 |
|---|---|---|
| CN | 101230835 A | 7/2008 |
| DE | 20109835 U1 | 1/2002 |
| GB | 1031022 A | 5/1966 |
| GB | 2252295 A | 8/1992 |
| JP | 04237876 A | 8/1992 |
| JP | 5227062 A | 9/1993 |
| JP | 6156975 A | 6/1994 |
| JP | 10129980 A | 5/1998 |
| WO | WO 03/100249 A1 | 12/2003 |
| WO | WO 03100249 A1 | 12/2003 |
| WO | WO 2007/033671 A1 | 3/2007 |

OTHER PUBLICATIONS

Claims of U.S. Appl. No. 13/441,178.*
Erich Hau; Book; 2003; Windkraftanlagen Grundlagen, Technik, Einsatz, Wirtschaftlichkeit.

(Continued)

*Primary Examiner* — David Bryant
*Assistant Examiner* — Moshe Wilensky

(57) ABSTRACT

A method for mounting a wind turbine blade to a wind turbine hub by use of a crane boom is provided. The orientation of the blade is kept substantially horizontal when the blade is lifted off the ground and mounted to the rotor hub. Control wires which connect the blade via the crane boom to a winch arrangement are used for keeping the blade orientation substantially horizontal in addition to at least one bearing wire for bearing the blade weight.

6 Claims, 5 Drawing Sheets

(56) References Cited

OTHER PUBLICATIONS

James F. Manwell, John MacLeod, Sally Wright, Lynn DiTullio, Jon G. McGowan; Others; 2006; Hull Wind II: A Case Study of the Development of a Second Large Wind Turbine Installation in the Town of Hull, MA.
1 Windkraftanlagen Grundlagen, Technik, Einsatz, Wirtschaftlichkeit; Erich Hau; 2003;.
Hull Wind II: A Case Study of the Development of a Second Large Wind Turbine Installation in the Town of Hull, MA; James F. Manwell, John MacLeod, Sally Wright, Lynn DiTullio, Jon G. McGowan; 2006;.
Smola; Internet: Wikipedia, Smola welcome page The Wind Power web page giving specific details of a Smola Windfarm;.
"Smola 2, Norway, Single Blade Erection using Siemens lifting yoke and LR1400W"; An enlarged photograph from the Weldex Website;.
Weldex website "The Wayback Machine" at http://www.archive.org;.
The code for the page displaying the photo and the tag taken from the wayback machine webside (2012Q01749); copy of the code for the page displaying the photo and the tag taken from the wayback machine webside;.
A print out of the internet site www.gjestekro.no. captured by the Wayback machine showing a second photograph of the Smola wind park installation in 2005, and an enlarged print of the displayed photograph;.
Three photos provided by Magne Gjemes of the Smola Kommune;.
Technical document in Japanese illustrating the LR1400W; 2005; Jun. 17, 2005.
Video at http:/www.youtube.com/user/videosphere#p/u/208/8h3S3KXebe8l, also filed on DVD;.
Video at http:/vvwvv.youtube.com/user/videosphere#p/u/209/6TCbnkLSkg, also filed on DVD;.

\* cited by examiner

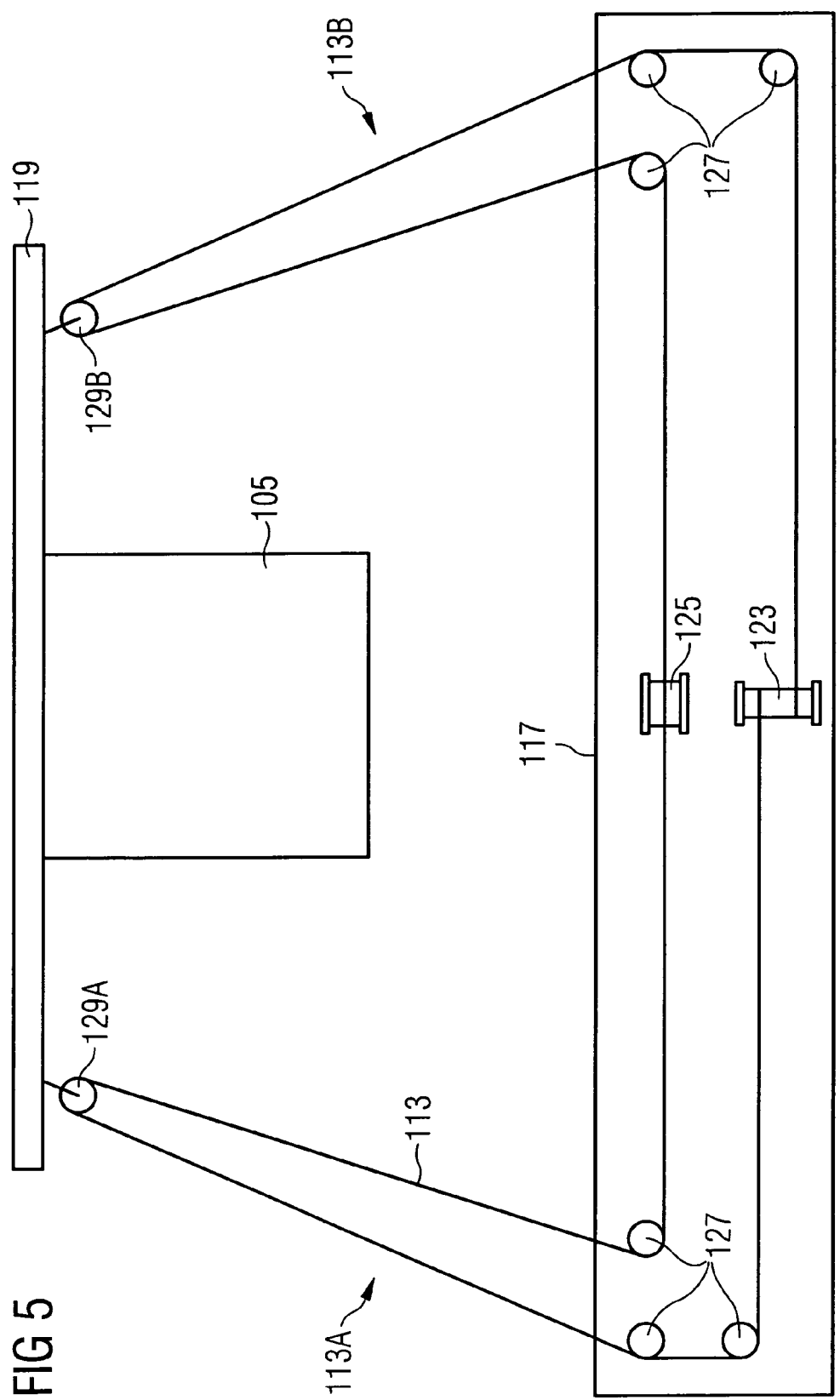

METHOD AND DEVICE FOR MOUNTING OF WIND TURBINE BLADES

CROSS REFERENCE TO RELATED APPLICATIONS

This application is the US National Stage of International Application No. PCT/EP2007/010221, filed Nov. 23, 2007 and claims the benefit thereof. The International Application claims the benefits of European application No. EP 06024336 filed Nov. 23, 2006, European application No. EP 06024337 filed Nov. 23, 2006, European application No. EP 07013725 filed Jul. 12, 2007, and European application No. EP 07013724 filed Jul. 12, 2007. All of the applications are incorporated by reference herein in their entirety.

FIELD OF THE INVENTION

In general, the invention relates to methods of handling wind turbine blades and mounting said blades on a wind turbine and a system and gripping unit for handling a wind turbine blade. In particular, the present invention relates to a method of mounting wind turbine blades to a rotor hub wherein the orientation of the blades is kept substantially horizontal when the blade is lifted off the ground. In addition, the present invention relates to a wind turbine blade lifting system which is particularly suitable for performing the inventive method.

BACKGROUND OF THE INVENTION

Modern wind turbines usually comprise a rotor with a considerable diameter and width. Mounting a wind turbine could include the steps of transporting the different elements to the site of the wind turbine, assembling the tower sections and the tower, lifting the wind turbine nacelle with a crane and mounting the nacelle on the top of the tower, assembling the wind turbine rotor on the ground, lifting the wind turbine rotor with a crane and mounting the rotor to a low speed shaft extending from the nacelle.

The usual way of mounting a wind turbine comprises a number of drawbacks which have become more and more severe with the increasing size and width of the wind turbine rotor. Assembling the wind turbine rotor on the ground is especially difficult as it requires a large area free of obstacles which is substantially horizontal and stable in order to be accessible for the assembly workers and the crane. Furthermore, lifting the rotor to the nacelle is rather complicated as the rotor must be turned by 90° in midair.

From US 2005/019166 A1, it is known to mount a rotor hub to which two blades are already mounted to the nacelle and then mounting the remaining rotor blade to the rotor hub with the blade in a vertical position.

In other lifting systems it is known to pre-mount the wind turbine hub on the nacelle and then lift each wind turbine blade individually to a position next to the hub and perform the mounting of the blades. In one such system, which is disclosed in US 2006/0120809 A1, the lifting is performed with the wind turbine blades held vertically with a lifting device. However, in this lifting system the blade has to be vertical during lifting and mounting. This means that, as a part of the lifting process, the blade has to be turned and during the positioning of the blade there is little control over the angular blade orientation.

In another lifting system which is disclosed in US 2006/0147308 A1, the blade is held substantially horizontal, resting in slings which are held by wires fixed to the turbine blade. This system has the advantage that the blade axis can be maintained in the same position during lifting and mounting as when resting on the ground. However, any wind occurring at the time of lifting will tend to deflect the blade. Consequently, such lifting requires a number of persons stationed at some distance from the turbine during lifting and holding long ropes to help steer the blade. For large blades and tall towers the control of such steering becomes a major challenge.

SUMMARY OF THE INVENTION

It is therefore an objective of the present invention to provide an advantageous method for lifting a wind turbine blade to a wind turbine hub. It is a further objective to provide an advantageous wind turbine blade lifting system.

These objectives are solved by a method for mounting a wind turbine blade on a wind turbine hub and by a wind turbine blade lifting system as claimed in the claims.

In the inventive method for mounting a wind turbine on a wind turbine hub by use of a crane boom the orientation of the blade is kept substantially horizontal when the blade is lifted off the ground and mounted to the rotor hub. Controllable wires, which are referred to as control wires in the following, and a winch arrangement are used for controlling the orientation of the blade in addition to at least one bearing wire for bearing the blade weight.

By connecting the blade to a winch arrangement via the control wire the blade's orientation can be controlled by using the winches which can be remotely controlled form location at a safe distance from the hanging blade. In contrast thereto, in the state of the art where ropes are held by persons on the ground for controlling the blade's orientation, these persons are more or less blow the blade and, hence, in a potential danger zone. Moreover, since it is not necessary to have personnel on the ground for handling control ropes, the number of persons needed for mounting the blade to the rotor hub can be reduced.

In a first implementation of the invention, control wires which connect the blade via the crane boom to a winch arrangement are used for keeping the blade orientation substantially horizontal and/or for controlling the blade's orientation within a horizontal plane in addition to the at least one bearing wire for bearing the blade weight.

By connecting the blade to a winch arrangement via the crane boom the blade's orientation can be controlled with respect to the crane boom. In contrast thereto, in the state of the art, ropes are held by persons on the ground and the blade's orientation is controlled with respect to some point on the ground. Therefore, when the crane boom moves the blade's orientation does not follow the boom automatically in the state of the art. In the inventive method, however, the blade's horizontal orientation will follow the crane boom's horizontal orientation automatically and controlling the blade's horizontal orientation can be simplified. Moreover, since it is not necessary to have personnel on the ground for handling control ropes, the number of persons needed for mounting the blade to the rotor hub can be reduced. A high degree of controllability can be achieved if at least two control wires are used which can be controlled independently of each other.

The inventive method can, in particular, comprise the following steps: a) lifting at least one wind turbine blade with a lifting system for handling wind turbine blades wherein said at least one wind turbine blade is oriented in a substantially horizontal position; the lifting system using a lifting device which is designed so as to be attachable to the wind turbine blade and to which the control wires and the at least one bearing wire are connected; b) controlling the orientation of said at least one wind turbine blade in the substantially horizontal position when it has been lifted off the ground using the control wires and c) fixing said at least one wind turbine blade in a substantially horizontal position to the wind turbine hub. This implementation of the method may further comprise, as a preceding step, the step of lifting a wind turbine hub to a nacelle of a wind turbine with the lifting system and mounting the hub on the nacelle or lifting the wind turbine hub and the nacelle together with the lifting system and mounting the nacelle including the hub on a wind turbine tower.

Furthermore, the control wires used in the inventive method may be kept pre-tensioned when the blade is lifted. By pre-tensioning the control wires the horizontal orientation of the blade can be kept particularly stable during the lifting process. In particular, as soon as the blade is lifted higher than the point at which the control wires reach the crane boom the blade's orientation can be securely fixed since the bearing cable and control wires drag the blade in more or less opposite directions. If, in this situation, the forces acting on the blade by the bearing wire on the one hand and the control wires on the other hand are high enough the blade is kept stable by these forces acting on three different contact points of the lifting device which is attached to the blade (one contact point for the bearing wire and at least two contact points for the control wires).

In a second implementation of the inventive method, a winch arrangement which is located at a lifting device which is designed so as to be attachable to the wind turbine blade, and at least one control wire which is controllable by the winch arrangement are used for controlling the distance of the blade from the crane boom and/or the orientation of the blade within the horizontal plane.

Like in the first implementation the horizontal orientation of the blade after lifting it off the ground is fixed with respect to the crane boom's orientation. However, locating the winch arrangement at the lifting device to which the blade to be lifted is attached rather than to the crane boom offers a constructive simple possibility to control the whole system such that no substantial load is acting perpendicularly on the crane boom when controlling the blade's orientation. This is in particular achievable if the at least one control wire is not directly connected to a location at the crane boom but via one or more ropes extending from a location at the crane boom's top end to a location at the crane boom's bottom end. Then, the forces exerted due to controlling the blade's orientation in a direction more or less perpendicular to the crane boom's extension can be transformed through the connection of the at least one control wire to the at least one guiding rope into forces acting more or less parallel to the crane boom at the points at which the rope is fixed to the boom. At the same time, one or more such ropes can be used for guiding the lifting device when the blade is lifted.

In particular, a winch arrangement with at least a first winch and a second winch can be used for controlling the at least one control wire. Then, the distance of the blade from the crane boom is controlled via the first winch and the orientation of the blade within the horizontal plane is controlled via the second winch. Separating the control function for controlling the distance of the blade from the crane boom from the control function for controlling the blade's orientation within the horizontal plane gives an increased controllability. For example, once a suitable orientation of the blade within the horizontal is achieved one needs from then on only to control the blade's distance from the crane boom which can be achieved by operation only one winch one the winch arrangement.

Controlling the blade's distance from the crane boom as well as the blade's orientation within the horizontal plane can be done with only one control wire if a control wire having a free length with at least a first branch comprising a first fraction of the control wire and a second branch comprising a second fraction of the control wire is used where both branches of the control wire are connected directly or indirectly (e.g. via one or more ropes extending from a location at the crane boom's top end to a location at the crane boom's bottom end) to the crane boom. The free length of the control wire is controlled via the first winch, and the distribution of the free length of the control wire to the first fraction and the second fraction is controlled via the second winch.

An inventive wind turbine blade lifting system which is suitable for performing the inventive method comprises a lifting device with a frame which is designed so as to be connectable to a wind turbine blade to be lifted, a crane boom, a winch arrangement and at least one control wire which runs to the winch arrangement for controlling the blade orientation to be substantially horizontal and/or for controlling the blade's orientation within a horizontal plane when it has been lifted off the ground.

The winch arrangement of the lifting system is located at the lifting device.

By using a winch arrangement for handling the control wires the number of personnel required for lifting a wind turbine blade can be reduced with respect to the state of the art for horizontally lifting wind turbine blades as has already been mentioned above.

The horizontal orientation of the blade after lifting it off the ground is controlled relative to the crane boom's orientation. Locating the winch arrangement at the lifting device to which the blade to be lifted is attached offers a constructive simple possibility to control the whole system such that no substantial load is acting to the crane boom in a perpendicular direction when controlling the blade's orientation. This can be achieved if the lifting system comprises at least one rope which extends from the top end of the boom to its bottom end and in which the control wire is connected to the at least one rope. Then, forces acting along the control wire will be transferred to the rope so as to act along the rope. In particular, the at least one control wire may be connected to the at least one rope by means of pulleys. This kind of connection allows to continuously relocate the connection point between the control wire and the rope when lifting the blade. Hence the rope can also be used as a guiding means, i.e. a guiding rope, for the lifting device.

In a particular implementation the lifting system comprises at least one control wire having a free length with at least a first branch comprising a first fraction of the control wire and a second branch comprising a second fraction of the control wire both branches of the control wire being connected directly or indirectly to the crane boom. In addition, the winch arrangement comprises at least a first winch and a second winch, where the first winch is designed to act on the control wire for controlling its free length and the second winch is designed to act on the control wire for controlling the distribution of the free length of the control wire to the first fraction and the second fraction. This particular implementation separates the control function for controlling the distance of the blade from the crane boom from the control function for controlling the blade's orientation within the horizontal plane.

The control wire in the particular implementation may comprise ends which are connected to the first winch and an intermediate section which is wrapped around the second winch. Due to the ends of the control wire being fixed to the first winch the first winch allows for controlling the length of the control wire by winding its end portions up and off the winch. On the other hand, since the intermediate section of the control wire is only wrapped around the second winch, a rotation of the winch does not lead to winding this section of the control wire up or off the winch but to shifting of parts of a branch to the respective other branch and vice versa, thereby lengthening one of the branches and, at the same time, shorting the respective other branch.

In the described particular implementation a first rope and a second rope may extend from the top end of the boom to its bottom end. Then, the first branch and the second branch of the control wire are connected to the first rope and the second rope, respectively. These ropes transform the forces exerted by the control wire in a direction substantially perpendicular to the boom into forces acting substantially parallel to the boom. Furthermore, if the first branch and the second branch of the control wire are connected to the first rope and the second rope, respectively, by means of pulleys both ropes can act as guiding ropes. However, the use of two ropes is not mandatory. Both branches can also be connected to the same rope, so that only one rope needs to be present.

In the lifting system the at least one control wire can run within a substantially horizontal plane so that all forces acting on the blade for controlling its orientation within the horizontal plane can act in or parallel to the horizontal plane in which the blade is to be oriented. Since the forces then have no components in a direction perpendicular to that plane (those components would not contribute to the control action within the horizontal) the forces which have to be applied by the winch arrangement can be kept as low as possible and, as a consequence, the winches of the winch arrangement can be dimensioned relatively small.

BRIEF DESCRIPTION OF THE DRAWINGS

Further features, properties and advantages of the present invention will become clear from the following description of an embodiment of the invention in conjunction with the accompanying drawings.

FIG. 5 schematically shows the run of the control wire in the inventive wind turbine blade lifting system.

DETAILED DESCRIPTION OF THE INVENTION

Figure 1:
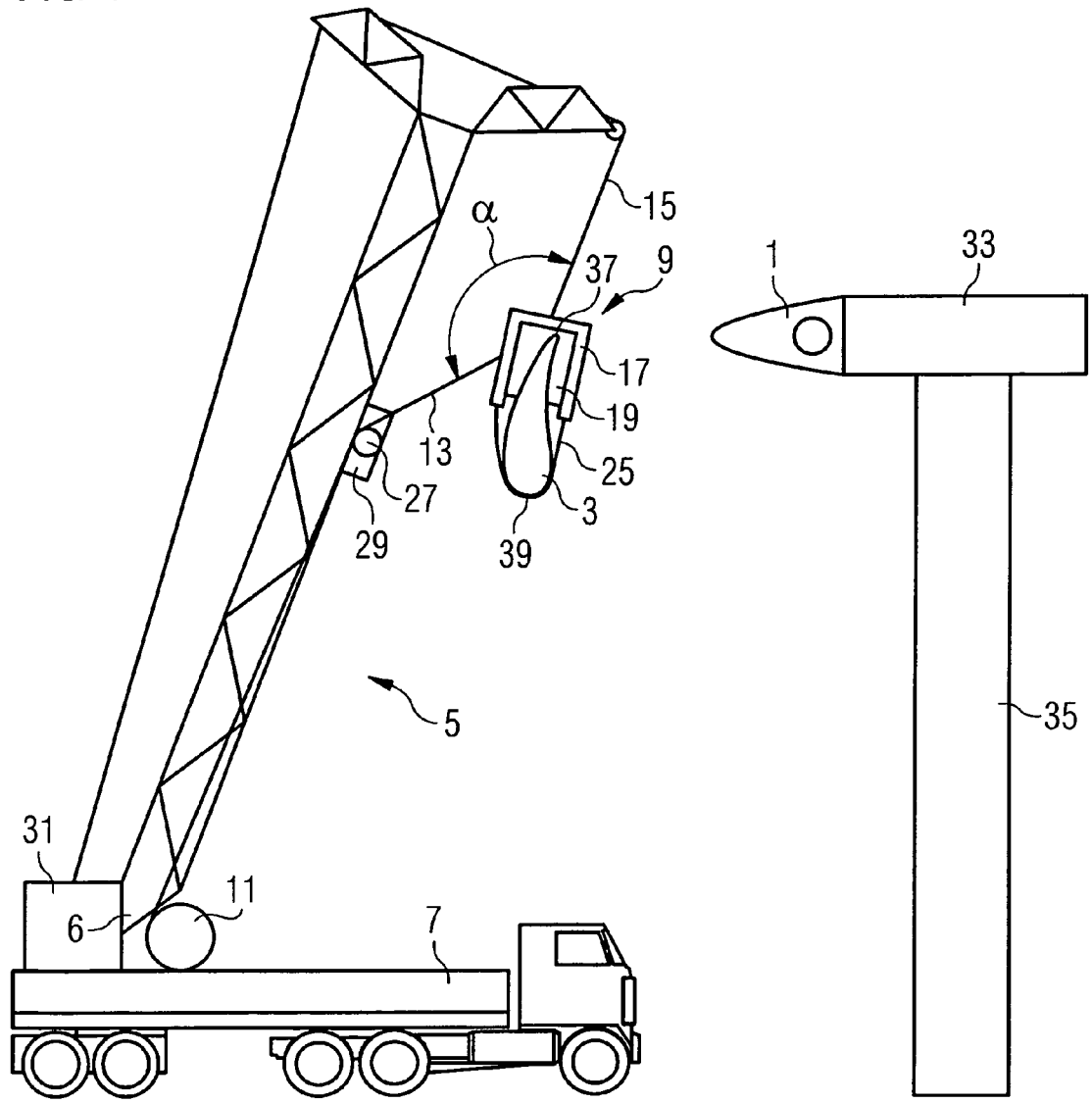
FIG. 1 shows a wind turbine blade lifting system for performing the inventive method.
Figure 2:
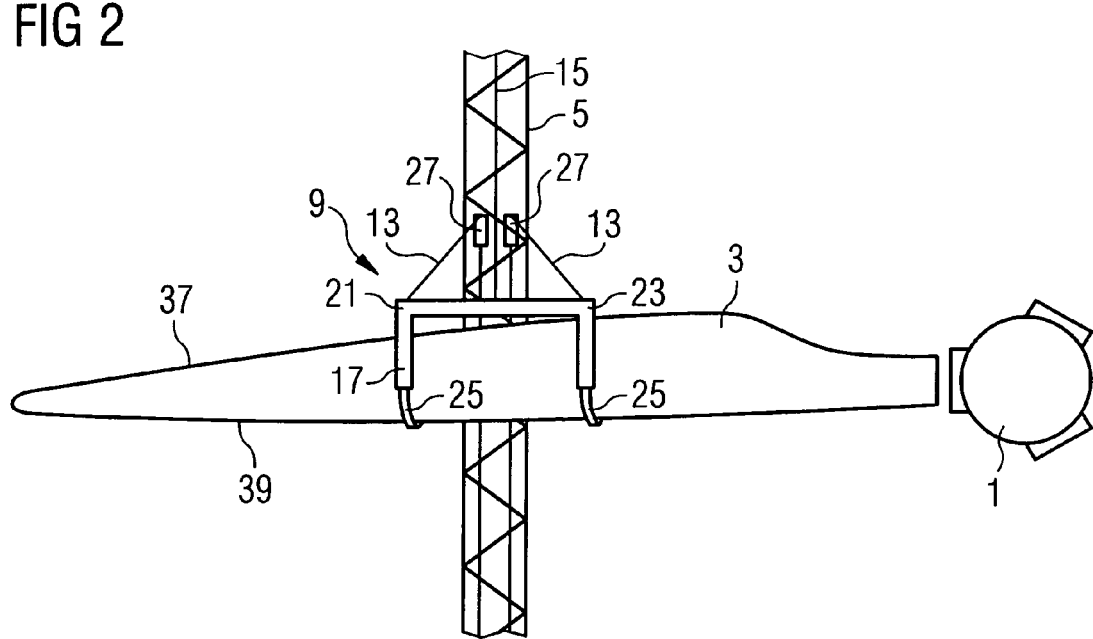
FIG. 2 shows a section of the wind turbine blade lifting system of FIG. 1 in a viewing direction which is perpendicular to the viewing direction of FIG. 1.

A wind turbine blade lifting system will now be described with respect to FIGS. 1 and 2. This system, which is not part of the invention itself, is suitable for performing the inventive method. While FIG. 1 shows the lifting system in a view onto the tip of the lifted turbine blade, FIG. 2 shows the upper part of the wind turbine blade lifting system in a plan view onto the blade's body. Also shown in both figures is the rotor hub 1 onto which the blade 3 is to be mounted. It is located at a nacelle 33 at the top of a tower 35.

The wind turbine blade lifting system comprises a crane boom 5 which is mounted onto a truck 7, a lifting device 9 which can be connected to the wind turbine blade 3, a winch arrangement comprising two individually controllable winches 11, control wires 13 (only one control wire is visible in FIG. 1) and a bearing wire 15.

The holding device 9 comprises a frame 17 and seats 19 on both ends 21, 23 of the frame 17 to which the wind turbine blade 3 is pressed by belts or straps 25. In addition, the bearing wire 15 is fixed to a central area of the frame 17 and the control wires 13 are fixed to the frame 17 at its ends 21, 23.

The control wires run via pulleys 27 which are located at the boom 5 to the winches 11 of the winch arrangement. Both winches 11 of the winch arrangement are located at the bottom end 6 of the boom 5 and can be controlled individually so as to tension or loosen both control wires 13 individually. The pulleys 27 are mounted onto a sliding carriage 29 which can be moved along the boom 5.

The bearing wire 15 is connected to a further winch 31 which is operated for lifting the lifting device 9 with the blade 3 fixed thereto. In contrast thereto, the control wires 13 have no substantial bearing function.

Lifting a wind turbine blade 3 and mounting it to the rotor hub of a wind turbine will now be described with respect to FIGS. 1, 2 and 3. The method comprises the steps of: i) lifting a wind turbine hub 1 to the nacelle 33 of a wind turbine with a lifting system and mounting the hub 1 on the nacelle 33, or lifting the wind turbine hub 1 and the nacelle 33 together with the lifting system and mounting the nacelle 33 including the hub 1 on a wind turbine tower 35; ii) lifting at least one wind turbine blade 3 with a lifting system for handling the wind turbine blades 3, lifting said at least one wind turbine blade 3 into a substantially horizontal position; iii) controlling the orientation of said at least one wind turbine blade 3 in the substantially horizontal position when it has been lifted off the ground, using control wires 13 connecting the lifting system to the crane boom 5, and iv) fixing said at least one wind turbine blade 3 in a substantially horizontal position to the wind turbine hub 1. Hereby, it is possible to handle and mount a wind turbine blade 3 in an advantageous manner.

In one implementation of the lifting system, a control wire 13 is attached at each end 21, 23 of the lifting frame 9, as has been described with respect to FIGS. 1 and 2. The two control wires 13 run to the crane boom 5 and from there over a pulley 27 to two hydraulic winches 11 fitted to the crane boom 5 at its bottom end. The two hydraulic winches 11 can be controlled independently.

In another implementation of the lifting system the boom control wires 13 are kept automatically pre-tensioned during the lifting process so that control is maintained even though the distance from the pulleys 27 on the crane boom 5 to the lifting device 9 is changed during the hoisting of the lifting device 9. This is accomplished by having one hydraulic winch that automatically maintains wire tension and another hydraulic winch that regulates the horizontal orientation and is controlled manually.

The different steps of the method will now be described in more detail.

In a first step, the wind turbine rotor hub 1 is mounted to the nacelle 33 of a wind turbine in a conventional manner by using the crane boom 5. Alternatively, the rotor hub 1 could be mounted to the nacelle 33 on the ground and the nacelle together with the rotor hub 1 mounted thereto would then be mounted to the top of the tower 35 by using the crane boom 5. As mounting the nacelle 33 onto the tower top and mounting the rotor hub 1 to the nacelle 33 are conventional steps they are not depicted in the figures.

In the next step, the lifting device 9 is mounted onto a wind turbine blade 3 which rests on the ground with its downstream edge 37 showing upwards. For mounting the lifting device 9 the frame 17 is lowered onto the rotor blade 3 so that the seats 19 are set onto the downstream section 37 of the blade 3. Then, the belts 25 are wound around the upstream edge 39 of the blade 3, fixed to the frame 17 and tensioned so as to press the blade 3 to the seat 19.

After the lifting device 9 has been mounted onto the blade 3 and the blade 3 has been secured to the lifting device 9 they are both lifted together by coiling the bearing wire 15 with the second winch 31. At the same time, the control wires 13 are tensioned so as to drag the lifting device 9 with the blade 3 mounted therein towards the crane boom 5. During lifting, the sliding carriage with the pulleys 27 follows the blade 3 on its way upwards where it is located slightly below the lifting device 9. By this measure the length of the control wires between the pulleys 27 and the frame 17 of the lifting device 9 can be kept low and almost constant during the whole lifting process.

By locating the pulleys 27 below the frame 17 the tensioning force of the control wires act in a direction that includes an angle α to the lifting force exerted by the bearing wire 15. In the present embodiment, as shown in FIG. 1, the angle α is about 120°. Therefore, the tensioning forces exerted by the control wires 13 have substantial components in the direction opposite the lifting force exerted by the bearing wire 15. By this configuration the blade's position can be securely stabilised. At the same time the components acting perpendicular to the lifting force are still large enough for suitably controlling the horizontal orientation of the blade 3. The ratio of the tensioning force components which act in the opposite direction to the lifting force to those components which act perpendicular to the lifting force can be set by the position of the sliding carriage 29 relative to the lifting device 9. The lower the sliding carriage 29 is with respect to the lifting device 9 the higher the component of the tensioning force is that acts in the opposite direction to the lifting force as compared to the component acting in a perpendicular direction to the lifting force.

By differently pre-tensioning the control wires, the horizontal orientation of the turbine blade 3 can be varied. Varying the pre-tension of the control wires can either be done directly at the winches, for instance by personnel located at the winches 11, or remotely by the crane operator which would offer the advantage that all control actions for positioning the blade relative to the rotor hub 1 can be performed by the same person. Positioning the wind turbine blade 3 relative to the rotor hub 1 for mounting the blade 3 to the hub 1 is schematically shown in FIG. 3.

Although pre-tensioning the control wires 13 and controlling the horizontal orientation of the wind turbine blade 3 is performed by controlling both winches 11 of the winch arrangement individually it would also be possible to provide a winch which is acting on both control wires so as to always exert the same tensioning force on both control wires 13 while a second winch is used for regulating the horizontal orientation of the wind turbine rotor blade 3. This would offer the advantage that only one winch needs to be controlled in order to control the horizontal position of the blade 3. However, this simplification of controlling the horizontal position of the blade 3 has to be paid for by a more complex construction of the winch arrangement.

After the wind turbine blade 3 has been precisely oriented for mounting it to the rotor hub 1 personnel at the rotor hub fix the blade 3 to the hub and then the lifting device 9 is dismantled from the rotor blade 3.

Although in the described lifting system the pulleys are mounted on a sliding carriage 29 which can move along the boom 5 the pulleys can also be located at the boom 5 at a fixed position. In this case the ratio of the tensioning force components acting in the direction opposite the lifting force to the components acting perpendicular to the lifting force varies during the lifting process. However, this can be accounted for by suitably pre-tensioning the control wires 13 during the lifting process.

An embodiment of the inventive wind turbine blade lifting system will now be described with respect to FIGS. 4 and 5. FIG. 4 shows the embodiment in a perspective view similar to the view shown in FIG. 3. Elements which do not differ from those in the lifting system described with respect to FIGS. 1 to 3 and which are not necessary for understanding the embodiment of the inventive wind turbine blade lifting system have been omitted from the figure for clarity reasons. Elements that have been omitted although present also in the embodiment of the inventive wind turbine blade lifting system are, for example, the seats 19 and the belts 25 of a lifting device 9.

Figure 3:
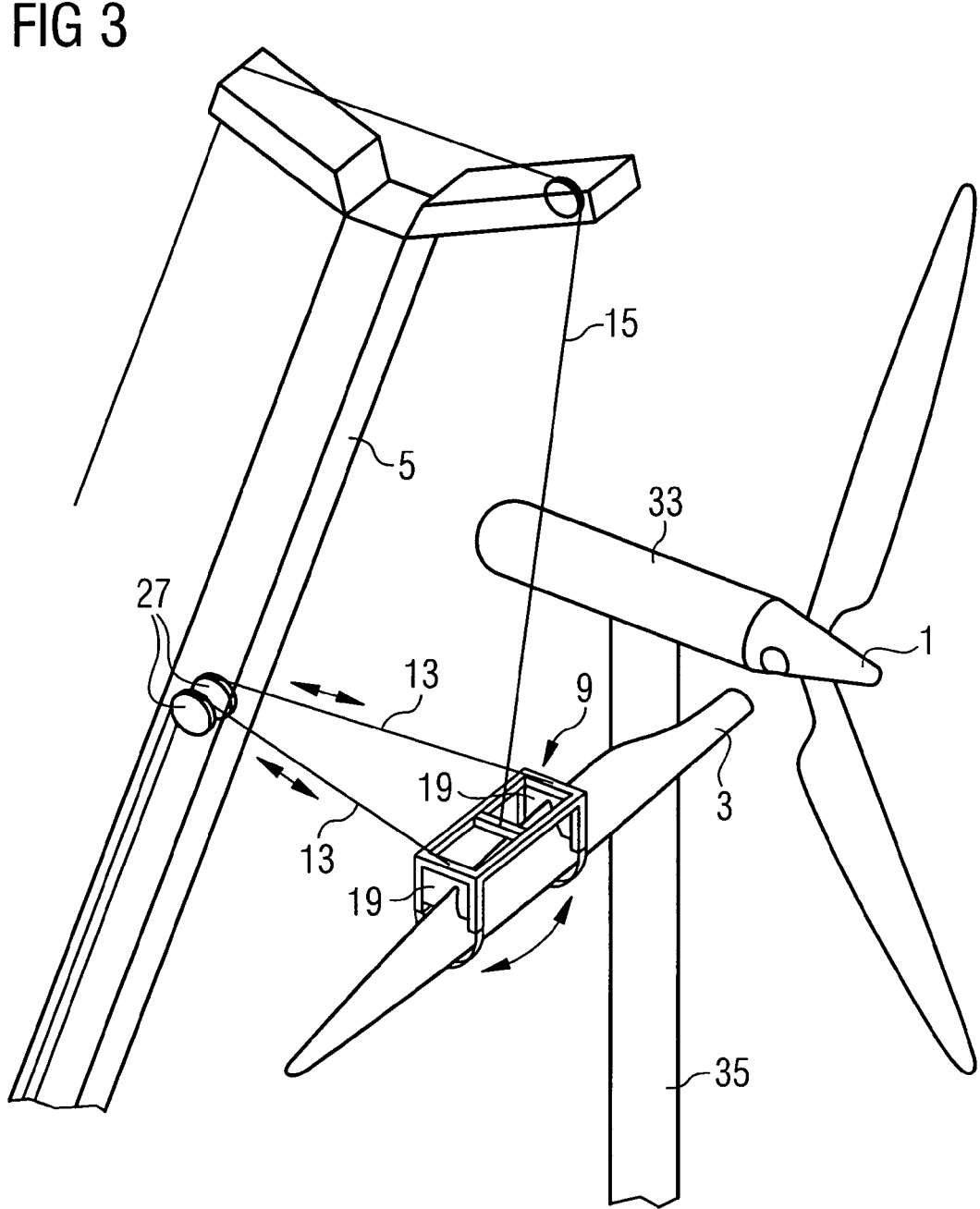
FIG. 3 shows the mounting of a wind turbine blade to a rotor hub by the use of the of the inventive wind turbine blade lifting system shown in FIG. 1.
Figure 4:
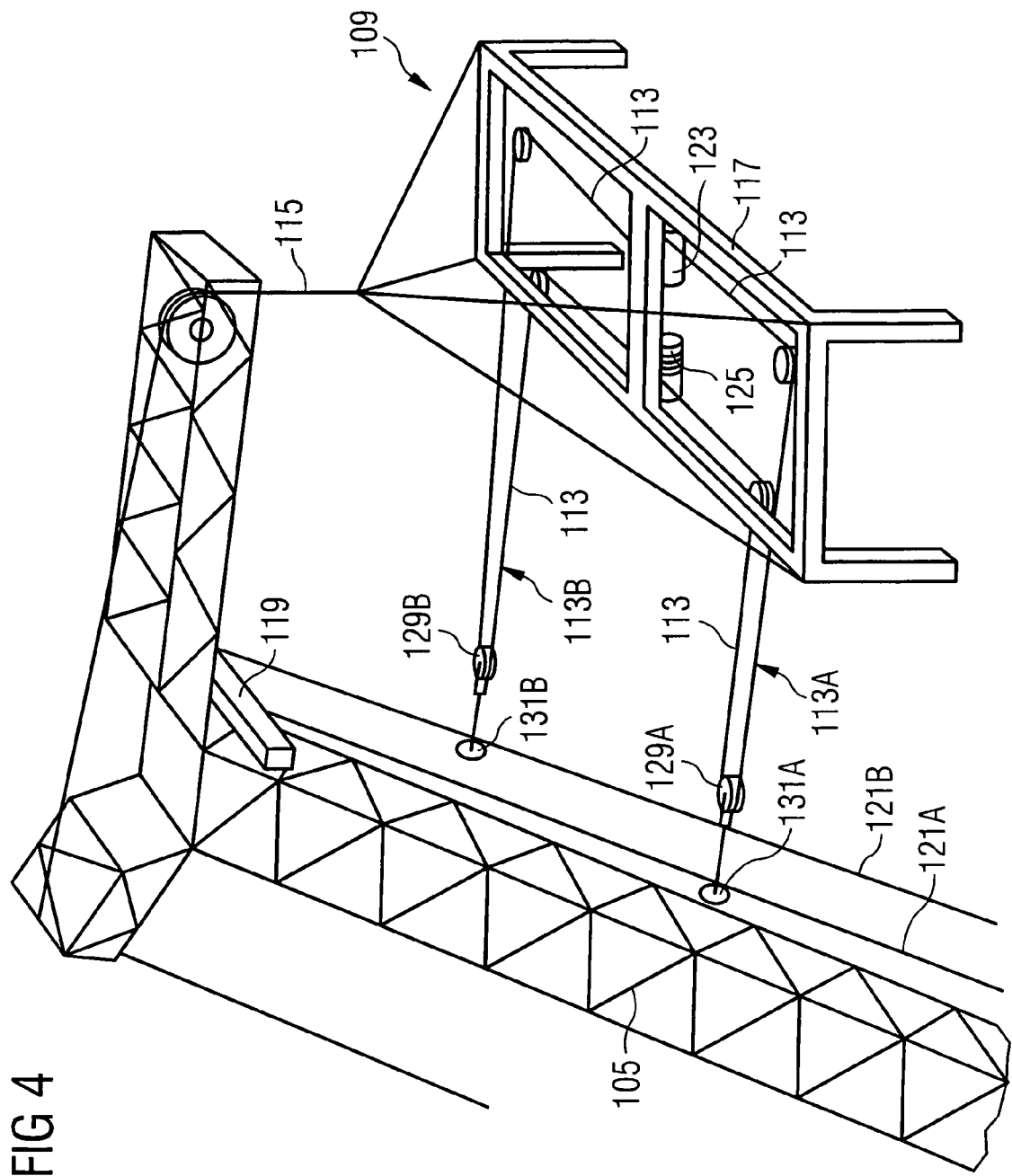
FIG. 4 shows an embodiment of the inventive wind turbine blade lifting system and the mounting of a wind turbine blade to a rotor hub by the use this embodiment.

The embodiment of the inventive wind turbine blade lifting device differs from the lifting system described with respect to FIGS. 1 to 3 in that the control wire 113 is not directly connected to the crane boom 105 but is connected to the crane boom 105 indirectly via guiding ropes 121A, 121B. Therefore, the crane boom 105 of the second embodiment comprises a traverse beam 119 mounted to a top section of the crane boom 105 from which tensioned guiding ropes 121A, 121B extend to a winch arrangement (not shown) at the bottom end of the crane boom 105. The guiding ropes 121A, 121B are tensioned by this winch arrangement.

A single control wire 113 is used for controlling the orientation of the lifting device 109—and thereby the orientation of a blade mounted to the lifting device—within a horizontal plane. The control wire is subdivided into a first branch 113A and a second branch 113B where each branch comprises a section of the free length of the control wire 113. Both ends of the control wire 113 are connected to a spool of a winch 123, and both ends of the control wire can be wound up or off the spool of the winch so as to shorten or lengthen the free length of the control wire 113, respectively, by turning the spool. Although both ends are connected to a single winch 123 two individual winches, one for each end of the control wire 113 could be present as well. However, using a single winch has the advantage that the length of the control wire can be controlled by only controlling a single winch.

An intermediate section of the control wire 113 is wound around the spool of a second winch 125. The intermediate section resembles a transition section between the first branch 113A and the second branch 113B. By turning the spool of second winch a length of the control wire can be transferred from one branch to the other.

The configuration of the winch arrangement comprising the winches 123 and 125 as well as the arrangement of the control wire 113 is depicted schematically in FIG. 5. The figure shows a top view onto the frame 117, the crane boom 105 and the traverse beam 119. The control wire 113, which is fixed with both of its ends to the spool of first winch 123, runs via two deflection pulleys 127 to a pulley arrangement comprising a first pulley 129A and a second pulley 131A (the whole pulley arrangement can be seen in FIG. 4) and from there back to a deflection pulley 127 and to the spool of the second winch 125. The control wire 113 is not fixed to the spool of second winch 125 but wrapped one or more times around it. The section of the control wire 113 that runs from the first winch 123 via the pulley arrangement 129A, 131A to the second winch 125 forms the first branch 113A of the control wire's free length. From the second winch 125 of the winch arrangement the control wire runs via a further deflection pulley to a pulley 129B of a pulley arrangement located between the control wire 113 and the second guiding rope 121B and from there via further deflection pulleys 127 back to the spool of the first winch 123 to which the second end of the control wire 113 is also fixed.

As can be seen in FIG. 5, winding the control wire ends up the spool of the first winch 123 will drag the frame 117, to which the winch arrangement is fixed, towards the crane boom 105. On the other hand, winding the ends of the control wire 113 off the winch 123 will allow the frame 117 to move away from the crane boom 105. Furthermore, rotating the spool of the second winch 125 will transfer free length from one of the branches 113A, 113B to the respective other branch. This leads to a shortening of one branch and, at the same time, to a lengthening of the respective other branch. By this means the angle of the frame 117 within a horizontal plane, for example relative to the traverse 119, can be changed by controlling the second winch 125. In FIG. 5 the long side of the frame 117 runs more or less parallel to the traverse 119. If now the spool of second winch 125 would be rotated such that free length of the control wire 113 is transferred from the first branch 113A to the second branch 113B the first branch end of the frame 117 would move towards the pulley 129A while the second branch end of the frame 117 would move away from the pulley 129B. As a consequence, the first branch end would turn towards the guiding rope 121A while the other end would move away from the respective guiding rope 121B. On the other hand, rotating the spool of the first winch 123 would move the frame 117 towards or away from the guiding ropes 121A, 121B without changing the orientation of the frame 117 within the horizontal plane.

As already mentioned, both branches 113A, 113B of the control wire 113 are connected to a respective guiding rope 121A, 121b via pulley arrangements 129A, 131A, 129B, 131B. This pulley arrangements allows for lifting the connection point between the branches 113A, 113B and the respective guiding ropes 121A, 121B when the lifting device 109 (with a wind turbine rotor blade fixed thereto) is lifted by means of the bearing wire 115. Note that in difference to the lifting system described with respect to FIGS. 1 to 3 the bearing wire comprises four branches each of which is connected to a corner of the frame 117. However the bearing wire of the lifting system described with respect to FIGS. 1 to 3 could also be used in the embodiment of the inventive wind turbine blade lifting system and vice versa.

In the embodiment of the wind turbine blade lifting system the distance of the blade from the crane boom 105 as well as the orientation of the blade within the horizontal plane can be controlled independent of reach other by independently controlling the winches 123, 125 of the winch arrangement at the frame 117. The forces which are exerted by the winch arrangement and transferred to the pulley arrangements 129, 131 via the control wire 113 will be transferred by the pulley arrangements to the guiding ropes 121. By the guiding ropes 121A, 121B these forces will be transmitted to the crane boom at the locations at which the guiding ropes 121A, 121B are fixed to it. Since the guiding ropes 121A, 121B are tensioned and run substantially parallel to the crane boom, the forces that are transferred to the crane boom at the location of the traverse 119 and the winches at the crane boom's bottom end act substantially parallel to the crane boom 105 which avoids loads acting perpendicular on the crane boom 105.

Lifting a wind turbine rotor blade with the embodiment of the inventive wind turbine blade lifting system does not differ from lifting a turbine blade with the lifting system described with respect to FIGS. 1 to 3 except for the way of controlling the orientation of the frame 117 and thereby the orientation of the blade within the horizontal plane and its distance from the crane boom.

The invention provides a possibility of controlling a wind turbine rotor blade's orientation in the substantially horizontal position when it has been lifted off the ground, using control wires connecting the lifting system to a crane boom. The feature of lifting the wind turbine blade in the same substantially horizontal orientation as it has when fitted to the lifting device when lying on the ground is advantageous as this eliminates any need for upturning the blade. The feature of controlling the orientation of the blade in the substantially horizontal position when it has been lifted off the ground, using control wires connecting the lifting system to the crane boom is advantageous as it eliminates the need for a group of persons stationed at ground level and seeking to control the orientation using long ropes. When installing the blade in accordance with the invention the crane operator can control both the lifting height and the blade orientation from one control position.

The invention claimed is:

1. A method for mounting a wind turbine blade to a wind turbine hub of a wind turbine by a crane boom, comprising:
keeping a blade orientation horizontal when lifting the wind turbine blade off a ground and mounting the wind turbine blade to the wind turbine hub;
bearing a weight of the wind turbine blade by a bearing wire; and
controlling the blade orientation by a control wire and a winch arrangement;
lifting the wind turbine blade with a lifting system comprising a lifting device which is attachable to the wind turbine blade and connects the control wires and the bearing wire;
controlling the blade orientation horizontal when lifting the wind turbine blade off the ground using the control wires; and
fixing the wind turbine blade in a horizontal position to the wind turbine hub,
wherein the control wire connects the wind turbine blade to the winch arrangement via the crane boom and keeps the blade orientation horizontal and controls the blade orientation within a horizontal plane, and
wherein the winch arrangement is located at the lifting device and controls the control wire for controlling a distance of the wind turbine blade from the crane boom and the blade orientation within the horizontal plane,
wherein:
the winch arrangement comprises a first winch and a second winch,
the first winch controls the distance of the wind turbine blade from the crane, and
the second winch controls the blade orientation within the horizontal plane.

2. The method according to claim 1, wherein
the control wire comprises a free length comprising a first branch and a second branch,
the first branch comprises a first fraction of the control wire,
the second branch comprises a second fraction of the control wire,
the first and the second branches are connected directly or indirectly to the crane boom, the first winch controls the free length of the control wire, and the second winch controls a distribution of the free length of the control wire to the first fraction and the second fraction.

3. The method according to claim 1, further comprising:

lifting the wind turbine hub to a nacelle of the wind turbine with the lifting system prior to lifting the wind turbine blade; and mounting the wind turbine hub on the nacelle.

4. The method according to claim 1, further comprising:

lifting the wind turbine hub and a nacelle of the wind turbine together with the lifting system prior to lifting the wind turbine blade; and mounting the nacelle including the wind turbine hub on a wind turbine tower.

5. The method according to claim 1, wherein at least two control wires are used which can be controlled independently to each other.

6. The method according to claim 1, wherein the control wire is pre-tensioned when the wind turbine blade is lifted.

\* \* \* \* \*